United States Patent
Kim et al.

(10) Patent No.: US 6,678,327 B1
(45) Date of Patent: Jan. 13, 2004

(54) IMAGE SIGNAL COMPRESSION CODING METHOD AND APPARATUS

(75) Inventors: Ji-ho Kim, Seoul (KR); Yung-jun Park, Gunpo (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 658 days.

(21) Appl. No.: 09/133,430

(22) Filed: Aug. 13, 1998

(30) Foreign Application Priority Data

Dec. 29, 1997 (KR) .............................. 97-76389

(51) Int. Cl.⁷ .............................. H04B 1/66; H04N 7/12; G06K 9/36
(52) U.S. Cl. ................ 375/240.16; 382/236; 348/419.1
(58) Field of Search ................................ 348/390, 387, 348/405, 419.1, 415, 401, 420, 416, 402; 382/236, 251; 375/240.03, 240.23, 240.16; 386/112

(56) References Cited

U.S. PATENT DOCUMENTS

| | | | |
|---|---|---|---|
| 5,198,900 A | * 3/1993 | Tsukagoshi | 375/240.16 |
| 5,317,396 A | * 5/1994 | Fujinami | 348/390 |
| 5,485,213 A | * 1/1996 | Murashita et al. | 348/415 |
| 5,598,213 A | * 1/1997 | Chung et al. | 348/405 |
| 5,686,962 A | * 11/1997 | Chung et al. | 348/416 |
| 5,699,119 A | * 12/1997 | Chung et al. | 348/405 |
| 5,825,931 A | * 10/1998 | Owada et al. | 382/236 |
| 6,101,313 A | * 8/2000 | Igarashi et al. | 386/112 |

FOREIGN PATENT DOCUMENTS

| | | |
|---|---|---|
| JP | 52-79720 | 5/1977 |
| JP | 52-079720 | 5/1977 |
| JP | 1-251973 | 6/1989 |
| JP | 4-288790 | 10/1992 |
| JP | 6-245190 | 2/1994 |
| JP | 6-78289 | 3/1994 |
| JP | 06-078289 | 3/1994 |

OTHER PUBLICATIONS

"Digital Signal Processing for Images" (pp 146–149; Third edition, Jul. 15, 1983); Published by Nikkan Kogyo Shimbun, Ltd.
XP000307852, "Picture Coding A Tutorial Introduction", vol. 15, No. 3/04, Jan. 1, 1991, pp. 41–74.
XP0005333739, "Block Predictive Transform Coding of Still Images", vol. CONF. 19, 1994, pp. V–333–V–336.

* cited by examiner

*Primary Examiner*—Gims Philippe
(74) *Attorney, Agent, or Firm*—Sughrue Mion, PLLC

(57) ABSTRACT

A progressive image signal compression coding method and apparatus are provided. If a progressive image signal composed of frames is input in units of fields, the input signal is compression-coded such that one field is compression-coded using only data from itself, and the other field is compression-coded using differential data between the previous field and that field without consideration of a motion vector, based on the characteristics of the input progressive image signal composed of frames. In such a manner, the amount of output data of the second field can be considerably reduced, so that the amount of output data of the first field increases.

7 Claims, 3 Drawing Sheets

IMAGE SIGNAL COMPRESSION CODING METHOD AND APPARATUS

BACKGROUND OF THE INVENTION

1. Field of the Invention

The present invention relates to a progressive image signal compression coding method and apparatus, and more particularly, to a method and apparatus for compression-coding a frame divided into fields in which each field is processed using data only from itself, and fields in which each field is processed using a differential component between two fields within one frame.

2. Description of the Related Art

A conventional image signal compression coding method is performed using frames as basic units, that is, intra (I) frames in which each frame is compression-coded using information only from itself, predicted (P) frames in which a differential component detected from the previous I or P frames temporally preceding the present frame are compression-coded, and bidirectional predicted (B) frames in which a differential component detected from the previous I or P pictures or the following I or P pictures are compression-coded.

As described above, in the conventional image signal compression coding method, output data is formed using inter-frame information using frames as basic units. However, although such a compression coding method is useful in forming the output data using the inter-frame data information, the intra-frame data information cannot be utilized.

SUMMARY OF THE INVENTION

To solve the above problem, it is an objective of the present invention to provide an image signal compression coding method for coding one field by coding data from only that field, and coding the other field by coding a differential component between two fields within one frame.

It is another objective of the present invention to provide an image signal compression coding apparatus for coding one field by coding data from only that field, and coding the other field by coding a differential component between two fields within one frame.

Accordingly, to achieve the first objective, there is provided an image signal compression coding method comprising the steps of (a) compression-coding one field of an input progressive image signal composed of frames, using only data from that field, and (b) compression-coding the other field using differential data between the previous field and that field.

To achieve the second objective, there is provided an image signal compression coding apparatus comprising a pre-processor for outputting in an unaltered state data of one field of an input progressive image signal composed of frames, and outputting the other field as differential data between that field and the previous field, and a coder for generating coded data by performing compression coding on the output of the pre-processor.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Hereinbelow, an image signal compression coding method and apparatus according to a preferred embodiment of the present invention will be described with reference to the accompanying drawings.

Figure 1:
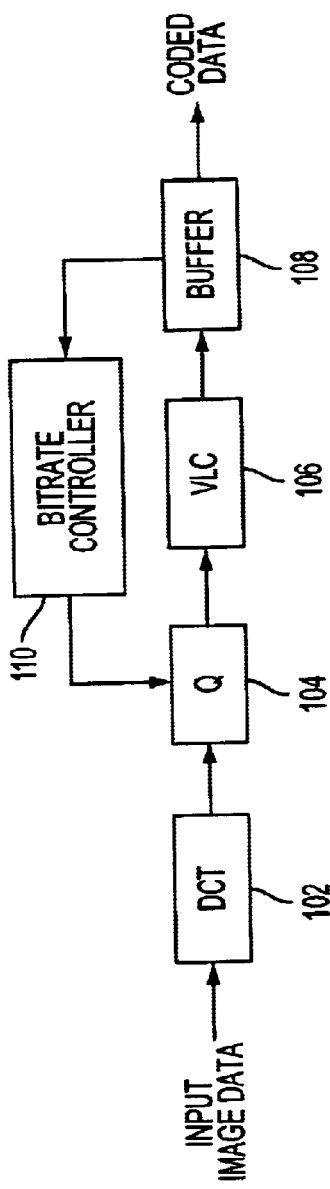
FIG. 1 is a block diagram of an image signal compression coder adopted by a general digital video recording/playback apparatus.

When a compression coding method is actually applied to a digital recording/playback apparatus, P frames and B frames using motion vectors between frames are not used often considering convenience of signal processing and trick play, and usually only I frames based on one frame are used. FIG. 1 is a block diagram of an image signal compression coder adopted by a general digital video recording/playback apparatus.

In FIG. 1, when a progressive image signal composed of frames is applied to a discrete cosine transform (DCT) processor 102, the DCT processor 102 DCT-processes the progressive image signal in units of DCT blocks (8 pixels×8 lines) and applies DCT coefficients of a frequency domain to a quantizer 104.

The quantizer 104 quantizes and compresses the DCT coefficients according to a quantization step size adjusted by a fixed bitrate for each frame, output from a bitrate controller 1 10. A variable length coder (VLC)106 variable-length codes the quantized coefficients supplied from the quantizer 104, and the variable-length coded data is temporarily stored in a buffer 108.

Figure 2:
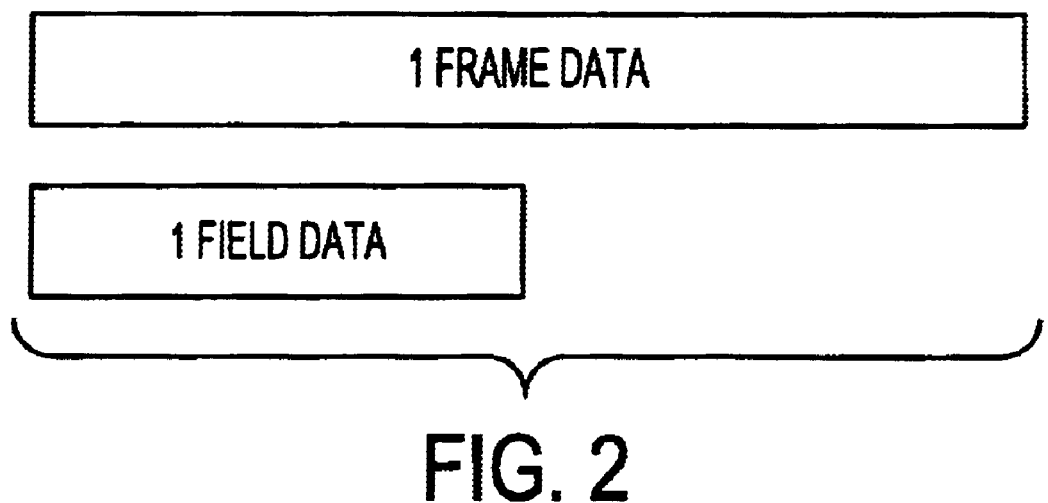
FIG. 2 shows the amount of output data of the image signal compression coder shown in FIG. 1.

FIG. 2 shows the amount of output data of the compression coder shown in FIG. 1. The bitrates are fixed in units of frames. Thus, when the frame-based processing result is fixed to a predetermined amount, the data of one field is half of one frame.

Thus, in the conventional compression coder in which inter-frame data information based on a motion vector is used in the general compression coder shown in FIG. 1, intra-frame data information is not used at all.

Figure 3:
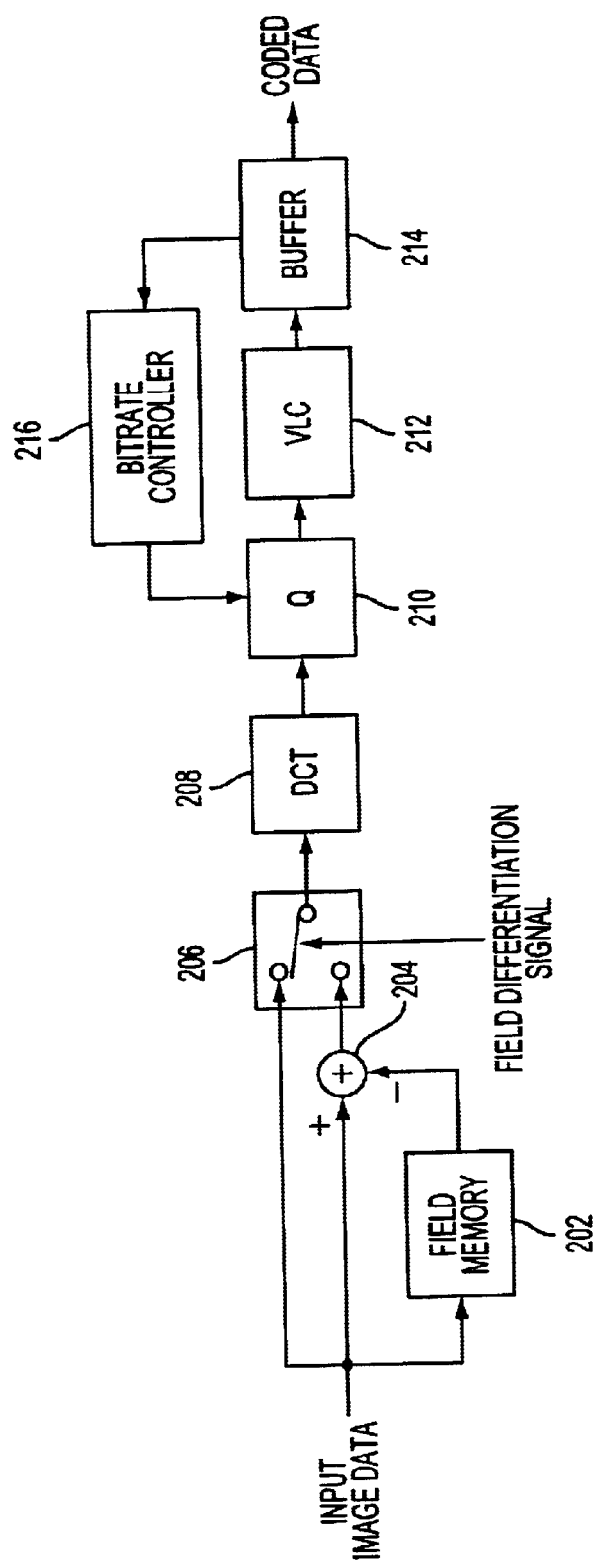
FIG. 3 is a block diagram of an image signal compression coder according to the present invention.

FIG. 3 is a block diagram of an image signal compression coder according to the present invention, in which compression coding is performed using a correlation of data between fields within one frame. In FIG. 3, a progressive image signal composed of frames is input in units of fields, and field data is simultaneously applied to a field memory 202 and a first input port of a selector 206.

A subtractor 204 subtracts the previous field data stored in the field memory 202 from input field data, and applies a differential component to a second input port of the selector 206.

According to the field discrimination signal, in the case of a field (e.g., a first field or an odd field) of a frame, the selector 206 selects data of one field currently being applied to the first input port, and applies the selected data to the DCT processor 208 to perform compression coding. This is the same as the compression coding performed by the compression coder shown in FIG. 1, except that the processing unit is not a frame but a field.

Also, according to the field discrimination signal, in the case of other fields (e.g., a second field or an even field) of a frame, the selector 206 applies a differential component between two fields within one frame to the DCT processor 208 to perform compression coding only on the differential component.

In other words, the DCT processor 208 DCT-processes the data selected by the selector 206 and applies DCT coefficients of a frequency domain to a quantizer 210. The quantizer 210 quantizes and compresses the DCT coefficients according to a quantization step size adjusted by a fixed bitrate for each frame, output from a bitrate controller 216. At this time, the quantization step size used in the present invention is smaller than that used by the compression coder shown in FIG. 1, when the fixed bitrate for each frame is the same as that of the compression coder shown in FIG. 1. Thus, in the present invention, a larger amount of coded data can be allocated for one field than in the case of frame-based compression coding.

A variable length coder 212 variable-length codes the quantized coefficients supplied from the quantizer 210, and the variable-length coded data is temporarily stored in a buffer 214. A bitrate controller 216 adjusts the quantization step size so that the bitrate of the data stored in the buffer 214 does not exceed the fixed bitrate for each frame.

Here, the field memory 202, the subtractor 204 and the selector 206 can be designated as a pre-processor. Also, the other blocks shown in FIG. 3, including the DCT processor, through the bitrate controller 208–216 and so on, can be designated as a coder, which is described here only as an illustrative embodiment, as many other applications are possible.

Also, under the condition that the overall amount of output data of one frame compression-coded by the configuration shown in FIG. 3 is the same as that of one frame shown in FIG. 2, according to the present invention, since the data of fields in which only differential components between fields are compression-coded is small, a large quantity of bits processed in another field can be acquired. Thus, more input data can be processed than in the conventional art, giving better picture quality.

Figure 4:
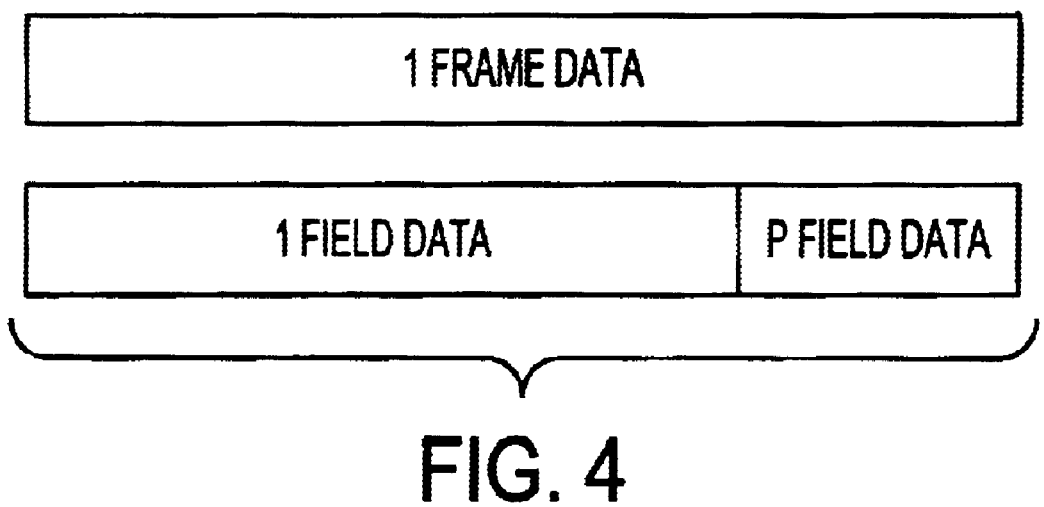
FIG. 4 shows the amount of output data of the image signal compression coder shown in FIG. 3.

In other words, as shown in FIG. 4, the bit amount of the field in which only the data from itself is processed (indicated by I field data) is larger than that of the field in which an inter-field differential component is processed (indicated by P field data).

Figure 5A:
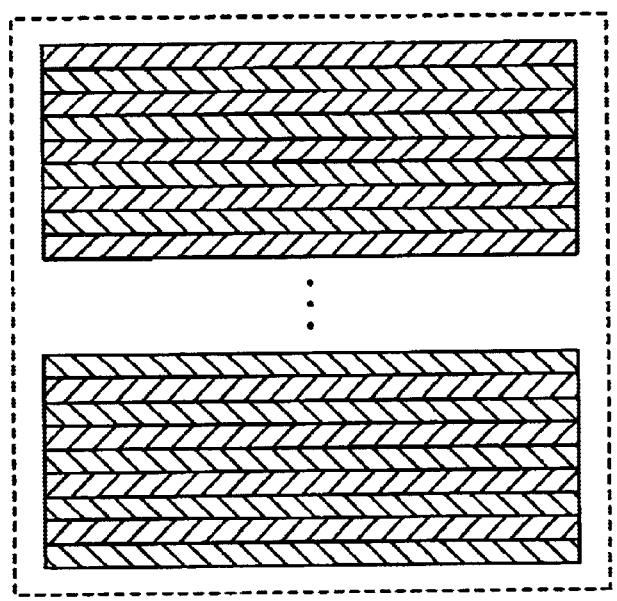
FIGS. 5A and 5B show the format of data input to the image signal compression coder shown in FIG. 3.
Figure 5B:
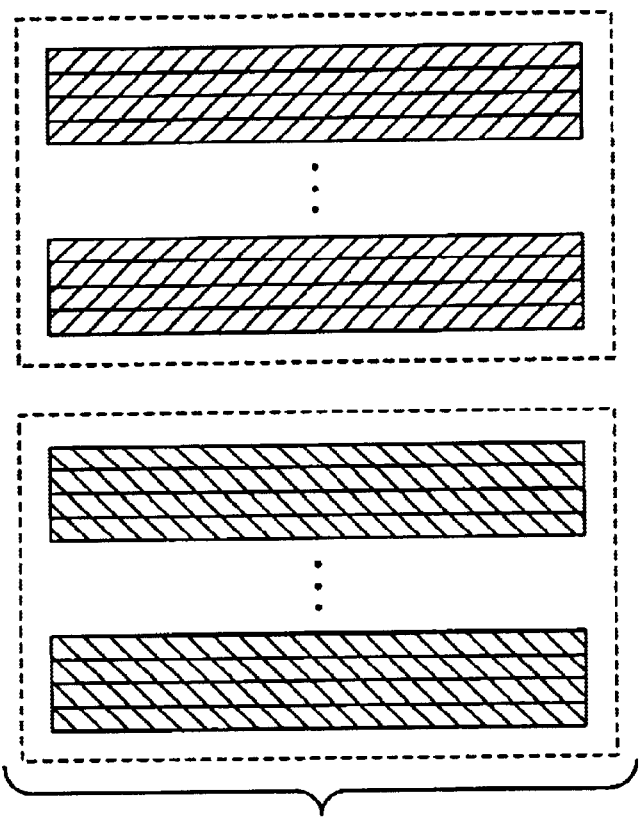

FIGS. 5A and 5B show the format of data input to the image signal compression coder according to the present invention. FIG. 5A shows the image composed of frames, and FIG. 5B shows the format of input data divided into fields.

According to the image signal compression coding method of the present invention, if a progressive image signal composed of frames is input in units of fields, the input signal is compression-coded such that one field is compression-coded using only data from itself, and the other field is compression-coded using differential data between the previous field and the present field (without consideration of a motion vector), based on the characteristics of the input progressive image signal composed of frames. In such a manner, the amount of output data of the other field can be considerably reduced so that the amount of output data of one field increases.

As described above, according to the present invention, compression coding is performed in units of fields such that one field is compression-coded using data from only that field, and the other field is compression-coded using differential data between two fields within one frame, thereby enabling a high resolution image signal to be processed.

What is claimed is:

1. An image signal compression coding method comprising the steps of:

(a) compression-coding one field of an input progressive image signal composed of frames, using only data from said one field; and (b) compression-coding another field of the input progressive image signal using differential data between said one field and said another field, wherein said one field and said another field are of the same frame.

2. The image signal compression coding method according to claim 1, further comprising the step of:

(c) dividing the progressive image signal composed of frames into units of fields.

3. An image signal compression coding method comprising the steps of:

(a) supplying delayed field data obtained by delaying one field of an input progressive image signal composed of frames;

(b) detecting differential data between the delayed field data and data of another field of the progressive image signal, wherein said one field and said another field are of the same frame;

(c) supplying data alternately selected from the one field data and the differential data, according to a field discrimination signal; and (d) coding selected data using a predetermined compression coding algorithm.

4. An image signal compression coding apparatus comprising:

a pre-processor for outputting unaltered data of one field of an input progressive image signal composed of frames, and outputting as data for another field of the input progressive image signal differential data between said one field and said another field, wherein said one field and said another field are of the same frame; and a coder for generating coded data by performing compression coding on the output of the pre-processor.

5. The image signal compression coding apparatus according to claim 4, wherein the pre-processor comprises:

a field memory for supplying delayed field data obtained by delaying said one field of the input progressive image signal of frames;

a detector for detecting differential data between said another field of the input progressive image signal and the delayed field data; and a selector for selectively outputting either the unaltered data of said one field or the differential data according to a field discrimination signal.

6. The image signal compression-coding apparatus according to claim 4, wherein the pre-processor further comprises:

a divider for dividing the input progressive image signal composed of frames into units of fields.

7. The image signal compression coding apparatus according to claim 5, wherein the coder comprises:

a discrete cosine transform (DCT) processor for DCT-processing the data selected by the selector and outputting DCT coefficients;

a quantizer for quantizing the DCT coefficients according to a quantization step size and outputting quantized data;

a variable length coder for variable-length coding the quantized data and outputting variable-length coded data; and a bitrate controller for adjusting the quantization step size so as to control the bitrate of the variable-length coded data to approximate a target bitrate fixed for each frame.

* * * * *